United States Patent
Lei

(10) Patent No.: US 11,102,700 B2
(45) Date of Patent: Aug. 24, 2021

(54) METHOD AND APPARATUS FOR DEVICE-TO-DEVICE INTERCONNECTED LOCAL AREA NETWORK

(71) Applicant: TENCENT AMERICA LLC, Palo Alto, CA (US)

(72) Inventor: Yixue Lei, Shenzhen (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/875,437

(22) Filed: May 15, 2020

(65) Prior Publication Data

US 2020/0367139 A1     Nov. 19, 2020

Related U.S. Application Data

(60) Provisional application No. 62/849,579, filed on May 17, 2019.

(51) Int. Cl.
| | |
|---|---|
| *H04W 40/24* | (2009.01) |
| *H04W 72/04* | (2009.01) |
| *H04W 40/12* | (2009.01) |
| *H04W 92/18* | (2009.01) |
| *H04W 88/16* | (2009.01) |

(52) U.S. Cl.
CPC ......... *H04W 40/248* (2013.01); *H04W 40/12* (2013.01); *H04W 72/04* (2013.01); *H04W 88/16* (2013.01); *H04W 92/18* (2013.01)

(58) Field of Classification Search
None
See application file for complete search history.

(56) References Cited

U.S. PATENT DOCUMENTS

| | | |
|---|---|---|
| 6,192,051 B1 | 2/2001 | Lipman et al. |
| 2008/0159143 A1 | 7/2008 | Nagarajan et al. |
| 2012/0302229 A1 | 11/2012 | Ronneke |

(Continued)

FOREIGN PATENT DOCUMENTS

WO    WO 2018/026923 A1    2/2018

OTHER PUBLICATIONS

International Search Report and Written Opinion dated Aug. 19, 2020 in International Application No. PCT/US 20/33228, 30 pages.

*Primary Examiner* — Brian S Roberts
(74) *Attorney, Agent, or Firm* — Oblon, McClelland, Maier & Neustadt, L.L.P.

(57) ABSTRACT

A method can include receiving member information from first member devices at a first gateway UE in a device-to-device (D2D) LAN. The D2D LAN can include a first sub-LAN and at least one second sub-LAN. The first sub-LAN can include the first gateway UE and the first member devices. Each of the second sub-LANs can include a second gateway UE and a set of second member devices. The first and second gateway UEs can be connected with sidelinks. The member information can indicate a first DEVICE ID associated with the respective first member device. A first member device list including the first DEVICE IDs of the first member devices can be updated based on the received member information. A first mapping update message including the updated first member device list and a first gateway ID of the first gateway UE can be broadcast to the second gateway UEs.

20 Claims, 8 Drawing Sheets

(56) References Cited

U.S. PATENT DOCUMENTS

| | | | |
|---|---|---|---|
| 2013/0024556 A1* | 1/2013 | Zhu | H04L 41/042 |
| | | | 709/223 |
| 2014/0328329 A1* | 11/2014 | Novlan | H04W 56/002 |
| | | | 370/336 |
| 2016/0135242 A1 | 5/2016 | Hampel et al. | |
| 2019/0052993 A1 | 2/2019 | Digirolamo et al. | |

* cited by examiner

METHOD AND APPARATUS FOR DEVICE-TO-DEVICE INTERCONNECTED LOCAL AREA NETWORK

INCORPORATION BY REFERENCE

This present application claims the benefit of U.S. Provisional Application No. 62/849,579, "Method and Apparatus for D2D Inter-connected LAN" filed on May 17, 2019, which is incorporated herein by reference in its entirety.

TECHNICAL FIELD

The present disclosure relates to wireless communications, and specifically relates to local area network (LAN) interworking via fifth generation (5G) radio technologies and routing techniques.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A fifth generation (5G) system specified by the 3rd Generation Partnership Project (3GPP) provides support to 5G LAN-type services. For example, 5G LAN-type services with 5G capabilities (e.g., performance, long distance access, mobility, and security) allow a restricted set of user equipment (UEs) to conduct IP and or non-IP type communications among each other. However, in scenarios where individual LANs are geographically close to each other, interconnecting those LANs using the 5G LAN-type services may be inefficient. For example, a 5G LAN capable UE can act as a gateway of an individual LAN among which non-5G capable devices and machines are deployed in a local area. Traffic among different UEs serving as gateways have to go across radio access network (RAN) nodes and even nodes within a 5G core network, which causes transmission inefficiency and delay.

SUMMARY

Aspects of the disclosure provide a method. The method can include receiving member information from first member devices at a first gateway user equipment (UE) in a device-to-device (D2D) local area network (LAN). The D2D LAN can include a first sub-LAN and at least one second sub-LAN. The first sub-LAN can include the first gateway UE and the first member devices exchanging D2D packets with the first gateway UE. Each of the second sub-LANs can include a second gateway UE and a set of second member devices exchanging D2D packets with the respective second gateway UE. The first and second gateway UEs can be connected with sidelinks. The member information can indicate a first Device IDentifier (ID) associated with the respective first member device. A first member device list including the first DEVICE IDs of the first member devices of the first sub-LAN can be updated based on the received member information. A first mapping update message including the updated first member device list and a first gateway ID of the first gateway UE can be broadcast to the second gateway UEs of the second-sub-LANs.

An embodiment of the method can further include receiving a second mapping update message from one of the second gateway UEs. The second mapping update message can include a second member device list that includes second DEVICE IDs of the second member devices of the one of the second sub-LANs and a second gateway ID of the one of the second gateway UEs. A mapping table can be updated based on the received second member device list. Each entry in the mapping table can be indexed by one of second DEVICE IDs of the second member devices of the second sub-LANs as a destination DEVICE ID and indicate a second gateway ID of one of the second gateway UEs that corresponds to the second sub-LAN including the second member device having the destination DEVICE ID.

In an embodiment, a configuration of radio resources over the sidelink connecting the first gateway UE and the second gateway UE from which the second mapping update message is received can be adjusted in response to an increase or decrease of one or more of the second member devices of the second gateway UE from which the second mapping update message is received.

In a further embodiment, a routing update message can be received during a routing update period at the first gateway UE from one of the second gateway UEs. The routing update message can indicate one or more link qualities of the sidelinks ended at the second gateway UEs from which the routing update message is received. A routing table can be updated based on the link qualities of the sidelinks indicated by the routing update message. Each entry in the routing table can be indexed by the second gateway ID of one of the second gateway UEs in the D2D LAN as a destination gateway UE and indicate the second gateway ID of one of the second gateway UE as a next hop gateway UE. A D2D packet can be received from one of the first member devices of the first sub-LAN. The D2D packet can include a destination DEVICE ID. The second gateway ID of the one of the second gateway UEs corresponding to the destination DEVICE ID in the mapping table can be determined based on the destination DEVICE ID in the D2D packet. One of the next hop gateway UEs can be determined according to the second gateway ID of the one of the second gateway UEs corresponding to the destination DEVICE ID and the routing table. The D2D packet can be forwarded to the determined next hop gateway UE.

In an embodiment, each of the link qualities of the sidelinks indicated by the routing update messages is indicated by a signal to interference and noise ratio (SINR) quality defined to be an averaged SINR value of a sequence of SINR values measured using reference signals transmitted over the respective sidelink during the routing update period.

In another embodiment, the updating the routing table based on the link qualities of the sidelinks indicated by the routing update messages includes selecting a route from multiple candidate routes between the first gateway UE and the destination gateway UE with a highest route quality. Each of the multiple candidate routes has a route quality defined to be a minimum SINR quality among the SINR qualities of the sidelinks along the respective candidate route.

In an example, the SINR qualities of the sidelinks indicated by the routing update messages are above a first link quality threshold, and SINR qualities of the sidelinks connecting the second gateway UEs that are below the first link quality threshold are not provided by the routing messages.

In an embodiment, the SINR qualities of the sidelinks indicated by the routing update messages are below a second link quality threshold. SINR qualities of the sidelinks connecting the second gateway UEs that are above the second link quality threshold are not provided by the routing messages. The updating the routing table based on the link qualities of the sidelinks indicated by the routing update messages includes selecting a route from multiple candidate routes between the first gateway UE and the destination gateway UE based on a metric of a least number of hops. Routes between the first gateway UE and the destination gateway UE that each include a sidelink associated with one of the SINR qualities indicated in the routing update messages received during the routing update period are excluded from the multiple candidate routes.

In an embodiment, the updating the routing table based on the link qualities of the sidelinks indicated by the routing update messages includes selecting a route from multiple candidate routes between the first gateway UE and the destination gateway UE. Routes between the first gateway UE and the destination gateway UE that each pass at least one intermediate node with a node quality lower than a node quality threshold are excluded from the multiple candidate routes. The node quality is defined to be an average of SINR qualities of sidelinks ended at the respective node.

In an embodiment, in response to candidate routes between the first gateway UE and the destination gateway UE each including a first intermediate node with a node quality lower than a first node quality threshold, it is determined to fall back to a path passing a fifth generation system (5GS) for forwarding a D2D packet from the first gateway UE and the destination gateway UE. In an example, the path is established between the first gateway UE and the destination gateway UE. In another example, the path is established between the first gateway UE and a second intermediate node in a first candidate route of the candidate routes between the first gateway UE and the destination gateway UE. The second intermediate node and any other intermediate node(s) between the second intermediate node and the destination gateway UE each have a node quality above a second node quality threshold higher than the first node quality threshold.

Aspects of the disclosure provide an apparatus in a first gateway UE. The apparatus can include circuitry configured to receive member information from first member devices at a first gateway user equipment (UE) in a device-to-device (D2D) local area network (LAN). The D2D LAN can include a first sub-LAN and at least one second sub-LAN. The first sub-LAN can include the first gateway UE and the first member devices exchanging D2D packets with the first gateway UE. Each of the second sub-LANs can include a second gateway UE and a set of second member devices exchanging D2D packets with the respective second gateway UE. The first and second gateway UEs can be connected with sidelinks. The member information can indicate a first Device ID associated with the respective first member device. A first member device list including the first Device IDs of the first member devices of the first sub-LAN can be updated based on the received member information. A first mapping update message including the updated first member device list and a first gateway ID of the first gateway UH can be broadcast to the second gateway UEs of the second-sub-LANs.

Aspects of the disclosure can provide a non-transitory computer-readable medium storing instructions that, when performed by a processor, cause the processor to perform the method.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The present disclosure provides techniques for interconnecting local area networks (LANs) using device-to-device (D2D) connections to form a D2D LAN. The D2D connections enable direct data transmissions among gateway user equipment (UEs) of the LANs without relying on fifth generation (5G) LAN-type services provided by a 5G system (5GS). For example, the D2D connections can be implemented as sidelinks as specified by the 3rd Generation Partnership Project (3GPP) standards.

Figure 1:
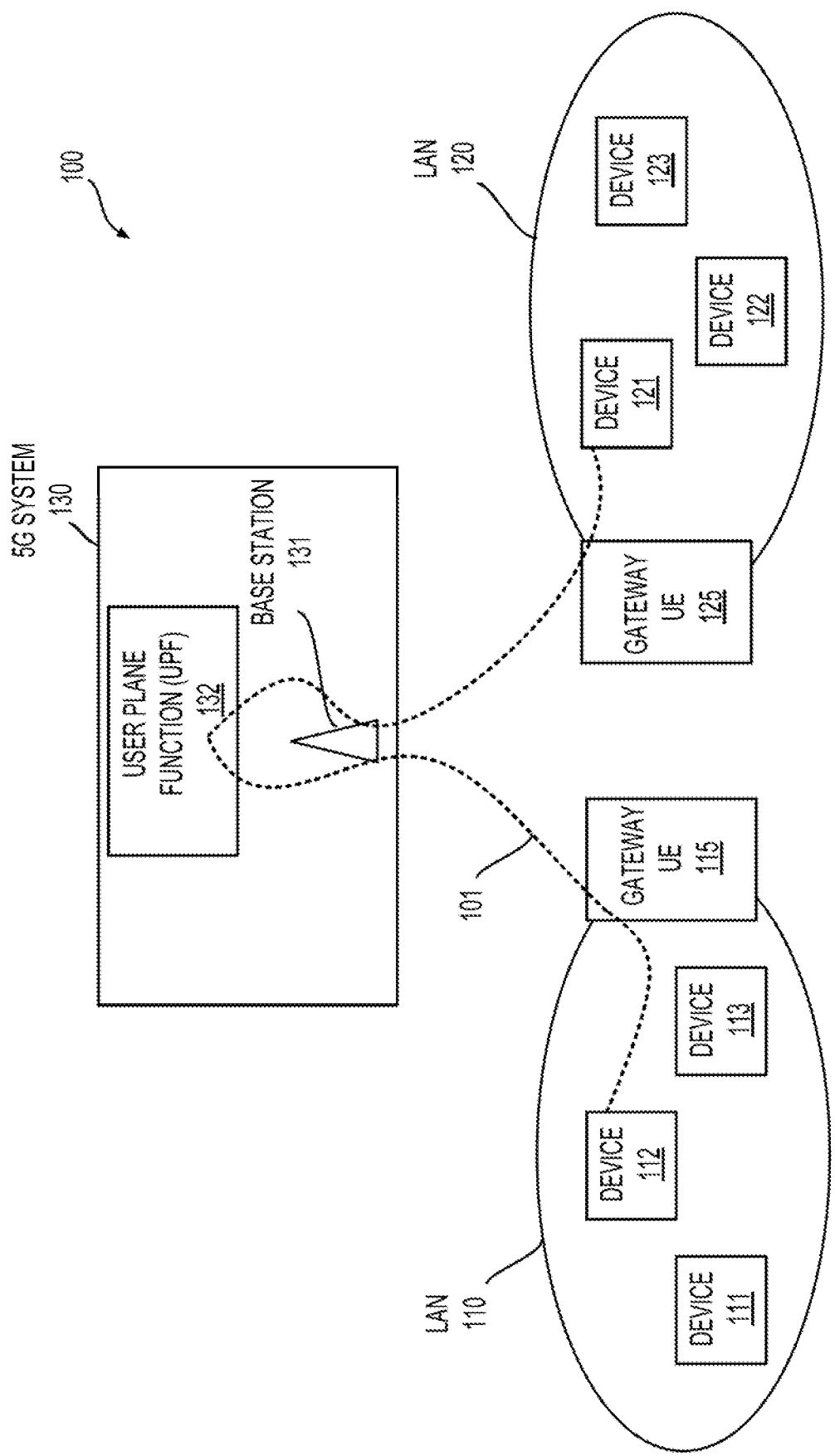
FIG. 1 shows an example of interconnecting LANs with fifth generation (5G) LAN-type services to form a 5G LAN 100.

FIG. 1 show s an example of interconnecting LANs with 5G LAN-type services to form a 5G LAN 100. As shown, two LANs 110-120 are connected via a 5GS 130. The LAN 110 includes devices 111-113 and a UE 115 serving as a gateway of the LAN 110, while the LAN 120 includes devices 121-123 and a UE 125 serving as a gate way of LAN 120. Each device 111-113 and 121-123 can be a mobile device (e.g., a laptop, a mobile phone, a vehicle, a mobile robot, and the like), or a stationary device (e.g., a factory machine, a camera, an ATM, a utility meter, an access control reader, and the like).

The gateway UEs 115 and 125 can each be a 5G LAN capable device configured to communicate with each other using 5G LAN-type services provided by the 5GS 130. For example, the gateway UE 115 receives data from the source devices 111-113 and forwards the data to the gateway UE 125 via the 5GS 130. The gateway UE 125 distributes the received data to the destination devices 121-123.

The 5GS 130 can be an implementation of a 5GS as specified by 3GPP standards, and configured to provide the 5G LAN-type services to the LANs 110-120 as specified by 3GPP standards. The 5GS 130 is shown to include a base station 131 and a user plane function (UPF) 132. The base station 131 communicates with each of the gateway UEs 115 and 125 via an air interface (e.g., 5G new radio (NR)). Inside the 5GS 130, the base station 131 communicates with the UPF 132 via another interface (e.g., N3 interface) to forward or receive user data to or from the UPF 132. The UPF 132 is a core network element of the 5GS 130, and provides a data path (referred to as a protocol data unit (PDU) session) between a source LAN to a destination LAN that traverses a core network of the 5GS 130.

In the FIG. 1 example, the device 112 of the LAN 110 communicates with the device 121 of the LAN 120. A connection 101 is established between the device 112 and the device 121. As shown, the connection 101 passes the sequence of nodes/devices: the device 112, the gateway UE 115, the base station 131, the UPF 132, the base station 131, the gateway UE 125, and the device 121. In an example, the UPF 132 is localized at the base station 131. Accordingly, the connection 101 passes the following sequence of nodes/devices: the device 112, the gateway UE 115, the base station 131, the gateway UE 125, and the device 121.

In a scenario where the two LANs 110-120 are geographically close to each other, routing traffics between the two LANs through the 5GS 130 become inefficient, and directly interconnecting the LANs 110-120 using a D2D connection may yield a better performance for interaction between the LANs 110-120.

Figure 2:
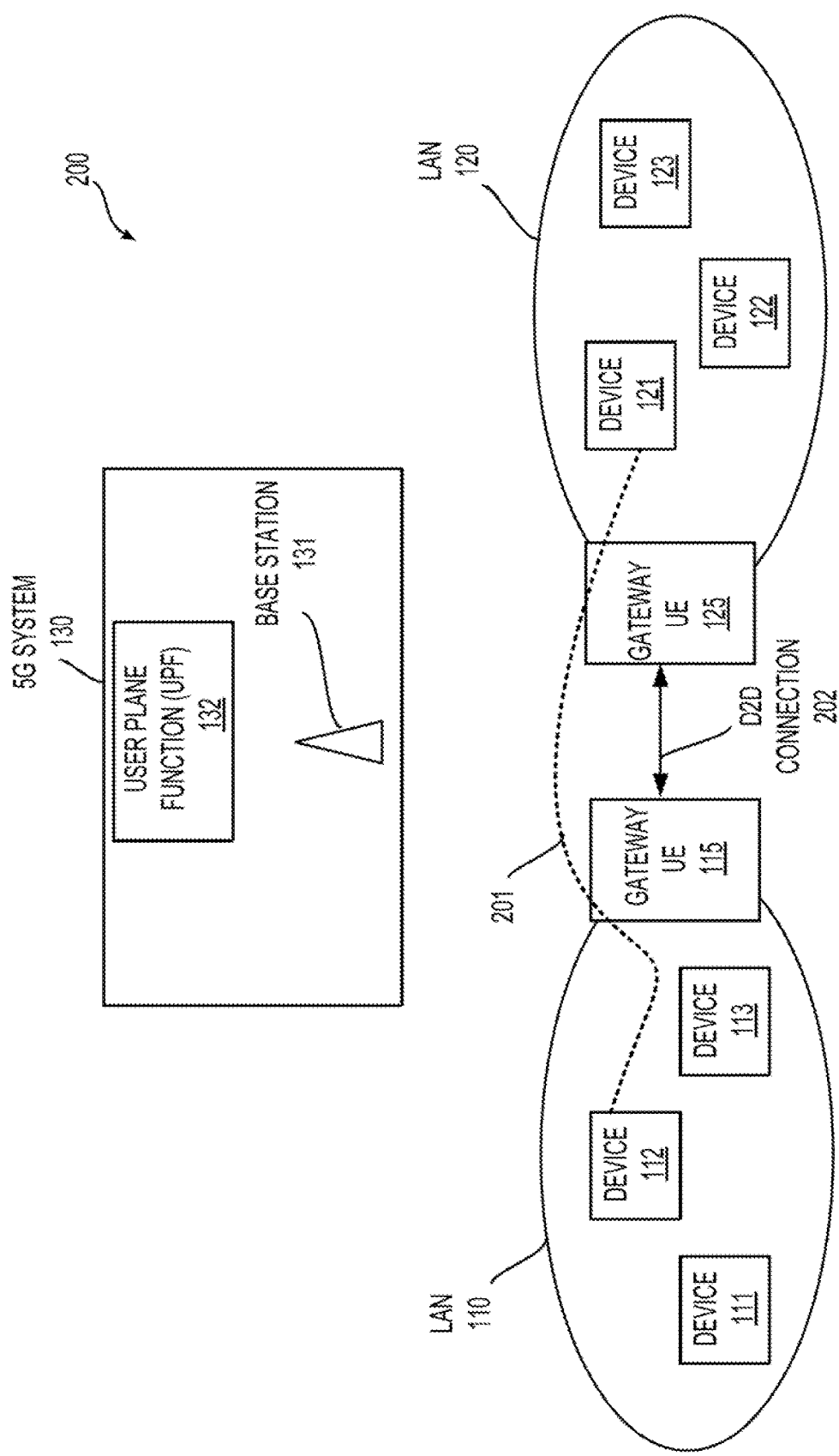
FIG. 2 shows an example of interconnecting LANs with a device-to-device (D2D) connection to form a D2D LAN 200 according to some embodiments of the disclosure.

FIG. 2 shows an example of interconnecting LANs with a D2D connection to form a D2D LAN 200 according to some embodiments of the disclosure. A similar set of elements as in FIG. 1 are shown in FIG. 2. For example, the LAN 110 includes devices 111-113 with the UE 115 acting as a gateway UE, and the LAN 120 includes devices 121-123 with the UE 125 acting as a gateway UE. The LANs 110 and 120 can be geographically close to each other. The gateway UE 115 is thus directly coupled with the gateway UE 125 to form the D2D LAN 200. The D2D LAN 200 can include the elements of the LAN 110 and the LAN 120. A D2D connection (e.g., a sidelink) 202 is used to connect the two LANs 110-120. With respect to the D2D LAN 200, the LAN 110 or 120 can be referred to as a sub-LAN in this disclosure.

As an example, a connection 201 between the device 112 and the device 121 is showon in FIG. 2. The connection 201 passes the sequence of elements, the device 112, the gateway UE 115, and gateway UE 125, and the device 121. Compared with the connection 101 in FIG. 1 between the device 112 and the device 121 that detours the 5GS 130, the connection 201 bypasses the 5GS 130.

According to the disclosure, the shorter path 201 bypasses the 5GS 130, and thus can potentially reduce transmission delay. In addition, compared with using 5G LAN-type services to form a LAN, D2D connection based LAN interconnection can have less complexity and a lower cost. Further, in regions where no 5GS is deployed, a D2D LAN can still be feasible.

In an embodiment, the gate way UE 115 can be configured to perform a first discovery process to establish a mapping table to map a destination device address to a destination gateway UE address. For example, within the sub-LAN 110, the gateway 115 can broadcast a request for member information, and collect the requested member information from the member elements 111-113. The D2D LAN 200 may include gateway UEs other than the gateway UEs 115 and 125. Among those gateway UEs, the gateway UE 115 may exchange member information with other gateway UEs. As a result of the first discovery process, the gateway UE 115 can set up the mapping table indicating which gateway UE Ls associated with a destination device to which a packet from the sub-LAN 110 is destined for. For example, each element (e.g., the elements 112-113. 115, 125, and 121-123) in the D2D LAN 200 can be assigned an ID (referred to as a DEVICE ID). Each gateway UE (e.g., the gateway UEs 115 and 125) in the D2D LAN 200 can be assigned an ID (referred to as a gateway ID). The gateway ID can serve as a group ID for identifying the corresponding sub-LAN, or the corresponding group of member devices within the corresponding sub-LAN.

Within each sub-LAN, the gateway UE 115 or 125 can act as an aggregator, and collect DEVICE IDs of the respective member devices during the first discovery process. As a result, each gateway UE can have a list of DEVICE IDs of the member devices belonging to the respective sub-LAN. Each gateway UE can broadcast the respective list of DEVICE IDs together with the corresponding gateway UE ID during the first discovery process. Accordingly, at a receiving gateway UE, such as the gateway UE 115, lists of DEVICE IDs generated at all gateway UEs together with the respective gateway UE IDs can be available. Based on the lists of DEVICE IDs and the corresponding gateway UE IDs, the mapping table can be established as a result of the first discovery process. The respective DEVICE IDs can be listed in the mapping table each mapped to the respective gateway ID.

After the first discovery process, status of member devices in respective sub-LANs may change later on. For example, a member device may newly join a sub-LAN or leave a sub-LAN. According, a further discovery process can be performed to update member information at each gateway UE. For example, a newly added member device may automatically report member information to the respective gateway UE. Or, the gateway UE may periodically transmit a request to associated member devices for updating member information. By the updating operations within the respective sub-LAN, the gateway UE can keep the list of member devices up-to-date. At the same time, each gateway UE may periodically update the up-to-date list of member devices to other gateway UEs periodically or upon a change to the respective list of member devices.

For example, each gateway UE 115 or 125 can periodically broadcast the list of member devices associated with the respective gateway UE. For example, the list of member devices can be carried in a mapping update message. In this way, when a member device is added to the respective sub-LAN, or leaves the respective sub-LAN, the latest status of the member UEs can be updated to other gateway UEs or sub-LANs. In response, at the gateway UE receiving the mapping update message, the mapping table can be updated accordingly. Alternatively, instead of periodically broadcasting a mapping table update message, the gateway UE cart broadcast a mapping table update message in response to a member device newly joining or leaving the respective sub-LAN. In this way, member device updating cost can be reduced.

In an example, based on the updated member information and/or mapping table (including mapping relationship between DEVICE IDs and respective gateway UE IDs), the gateway UE 115 (or 125) can adjust sidelink resources to accommodate the data delivery among two sub-LANs considering newly discovered member devices or newly removed member devices as potential communication peers. For example, when the mapping table is newly established, the gateway UE 115 can configured radio resources on the sidelink 202 based on a number of member devices in the sub-LAN 120. Thereafter, a member device discovery process can be performed, and a mapping update message can be received at the gateway UE 115. The mapping update message can indicate one or more member devices are added to the sub-LAN 120. Accordingly, the gateway UE 115 may increase the radio resources configured for data delivery between the gateway UEs 115 and 125. In contrast, in case that a received mapping update message indicating one or more member devices are removed from the sub-LAN 120, the gateway UE 115 may reduce the radio resources configured between the gateway UE 115 and the gateway UE 125.

In an embodiment, the gateway UE 115 can be configured to perform a second discovery process to establish a routing table to map a destination gateway UE to a next hop gateway UE or map a destination gateway UE to a route passing the gateway UEs of the D2D LAN 200. For example, a link-quality aware routing protocol can be employed by the gateway UEs of the D2D LAN 200 to exchange and update routing related information. For example, the routing related information at a gateway UE can include existing connections with neighboring gateway UEs (identified by source and destination gateway IDs), and link qualities of those existing connections. The gateway UE 115 can collect the muting related information of the gateway UEs of the D2D LAN 200, and establish the routing table based on the link qualities reported from the respective gateway UEs.

In an embodiment, the gateway UE 115 can be configured to perform packet forwarding operations based on the mapping table and the routing table. For example, a packet is to be transmitted from the source device 113 to a destination device. The device 113 can carry a source DEVICE ID and a destination DEVICE ID in the packet. The source DEVICE ID and the destination DEVICE ID correspond to the source device 113 and the destination device, respectively. The packet can be transmitted to the gateway UE 115.

The gateway UE 115 can receive the packet, and, by consulting the mapping table, determine a destination gateway ID representing a destination gateway UE based on the destination DEVICE ID. The gateway UE 115 can subsequently determine a next hop gateway UE based on the destination gateway UE by consulting the routing table. The gateway UE 115 can then forward the packet to the next hop gateway UE.

The gateway UEs in the D2D LAN 120 can establish respective mapping tables and routing tables in a way similar to that performed at the gateway UE 115. Accordingly, the packet forwarded by the gateway UE 115 can be handled similarly as in the gateway UE 115 and forwarded hop by hop until the destination gateway UE is reached. At the destination UE, based on the destination DEVICE ID carried in the packet, the destination UE can forward the packet to the destination device.

In various embodiments, various LAN technologies can be employed in the sub-LAN 110 or 120. For example, the sub-LAN 110 or 120 can be a wireless LAN or a wired LAN. The wired LAN can be based on technologies of Ethernet, Token Ring, or the like. The wireless LAN can be based on technologies of IEEE 802.11 standards (infrastructure and ad hoc mode), D2D connection (e.g., sidelink), or the like.

Figure 3:
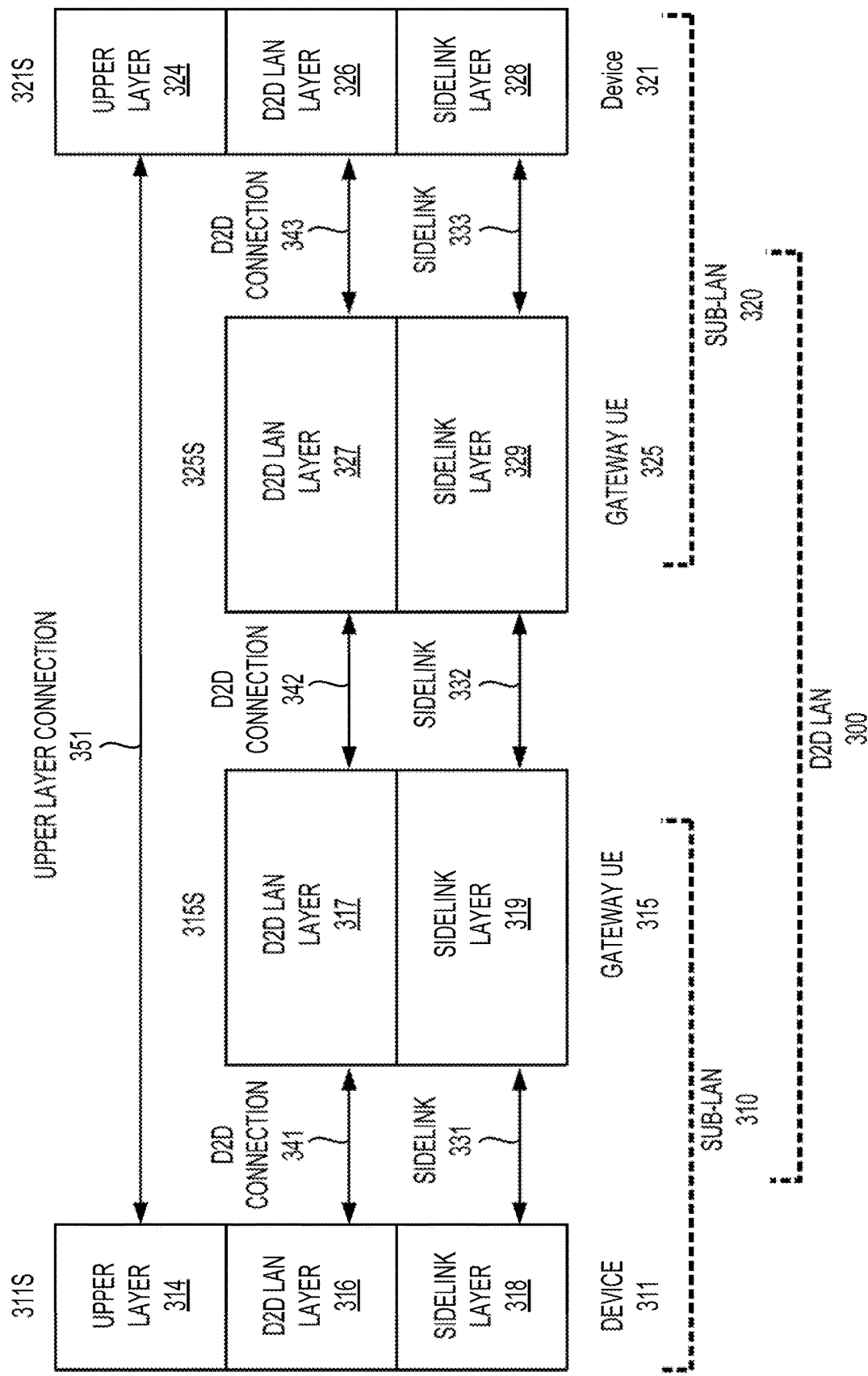
FIG. 3 shows protocol stacks of a D2D LAN 300 interconnected using sidelinks according to an embodiment of the disclosure.

FIG. 3 show s protocol stacks of a D2D LAN 300 interconnected using sidelinks according to an embodiment of the disclosure. The D2D LAN 300 can include a first sub-LAN 310 and a second sub-LAN 320. The sub-LAN 310 can include a member device 311 coupled to a first gateway UE 315, while the sub-LAN 320 can include a member device 321 coupled to a second gateway UE 325. Four protocol stacks 311S, 315S, 325S, and 321S corresponding to the elements 311, 315, 325, and 321, respectively, are shown.

The protocol stack 311S of the device 311 includes a sidelink layer 318, a D2D LAN layer 316, and an upper layer 314. The protocol stack 315S of the gateway UE 315 includes a sidelink layer 319, and a D2D LAN layer 317. Similarly, the protocol stack 321S of the device 321 includes a sidelink layer 328, a D2D LAN layer 326, and an upper layer 324. The protocol stack 325S of the gateway UE 325 includes a sidelink layer 329 and a D2D LAN layer 327.

At the sidelink layers 318/319/329/328, connections of sidelinks 331/332/333 are provided to connect the elements 311/315/325/321. For example, each of the sidelink layers 318/319/329/328 can include the following sublayers stacked from low to high: a physical (PHY) layer, a medium access control (MAC) layer, a radio link control (RLC) layer, and a packet data convergence protocol (PDCP) layer. In various embodiments, all or a subset of the PHY layer, the MAC layer, the RLC layer, and the PDCP layer are configured. In an example, the PDCP layer is configured to perform functions of header compression, ciphering, and/or integrity protection. In another example, the PDCP layer is optional. For example, the PDCP layer can be removed from each of the sidelink layers 318/319/329/328. Or, by configuration, the PDCP layer can be used or skipped for processing data packets. For example, each of the sidelink layers 318/319/329/328 can operate as specified by 3GPP standards. While the device 311 or 321 is shown to be connected with the gateway UE 315 or 325 via the sidelinks 331 or 333. respectfully, there can be other member devices in the sub-LAN 310 or 320 that are interconnected among themselves or to the gateway UE 315 or 325 via sidelinks Some of those member devices may be connected to the gateway UE 315 or 325 via multiple hops of sidelinks.

Each of the D2D LAN layers 317/327/326 can be configured to perform the first discovery processes for establishing a mapping table at the gateway UE 315. Each of the D2D LAN layers 317/327 can be configured to perform the second discovery processes for establishing a routing table at the gateway UE 315.

Each of the D2D LAN layers 317/327 can be configured to perform D2D packets forwarding functions based on the respective mapping table and routing table. For example, the D2D LAN layer 317 may receive a D2D packet from within the sub-LAN 310. The D2D packet may carry data of an application layer at a source device. In addition, the D2D packet can include a source DEVICE ID and a destination DEVICE ID. The D2D LAN layer 317 can forward the D2D packet carrying the application data to a next hop gateway UE after consulting the mapping table and the routing table. For example, the D2D LAN layer 317 may receive a D2D packet from a neighboring gateway UE (such as the gateway UE 325). Based on a destination DEVICE ID carried in the received D2D packet, the D2D LAN layer 317 can determine either to forward the D2D packet to an internal element (such as the device 311), or relay the D2D packet to a next hop gateway UE.

Each of the D2D LAN layers 316 326 can be configured to perform D2D packets forwarding functions to deliver the D2D packets to the gateway UE 315 or 325. For example, the D2D LAN layer 316 may receive a locally generated D2D packet from the upper layer 314, and forward the locally generated D2D packet to the D2D LAN layer 317 at the gateway UE 315. Or, the D2D LAN layer 316 may receive a D2D packet from a neighboring device of the sub-LAN 310, and relay the received D2D packet to the gateway UE 315. On an opposite direction, each of the D2D LAN layers 316/326 can be configured to receive D2D packets from the gateway UE 315 or 325, respectively, and relay the received D2D packets to neighboring devices or pass the received D2D packets to the upper layer 314 or 324, respectively.

As shown, the D2D LAN layers 316/317/327/326 resides over the sidelink layers 318/319/329/328, and use the sidelink layers 318/319/329/328 as a transport layer. For example, the sidelink layer receives packets (referral to as D2D LAN packets or D2D packets) formed at the D2D LAN layer and handles the delivery of the D2D packets, and passes received D2D packets to the above D2D LAN layer.

The upper layers 314 and 324 reside over the D2D LAN layers 316/317/327/326, and are coupled with each other via an upper layer connection 351. For example, the upper layer 314 or 324 can include applications that request services from the D2D LAN layers 316 or 326 for delivery data from a source application to a destination application.

Figure 4:
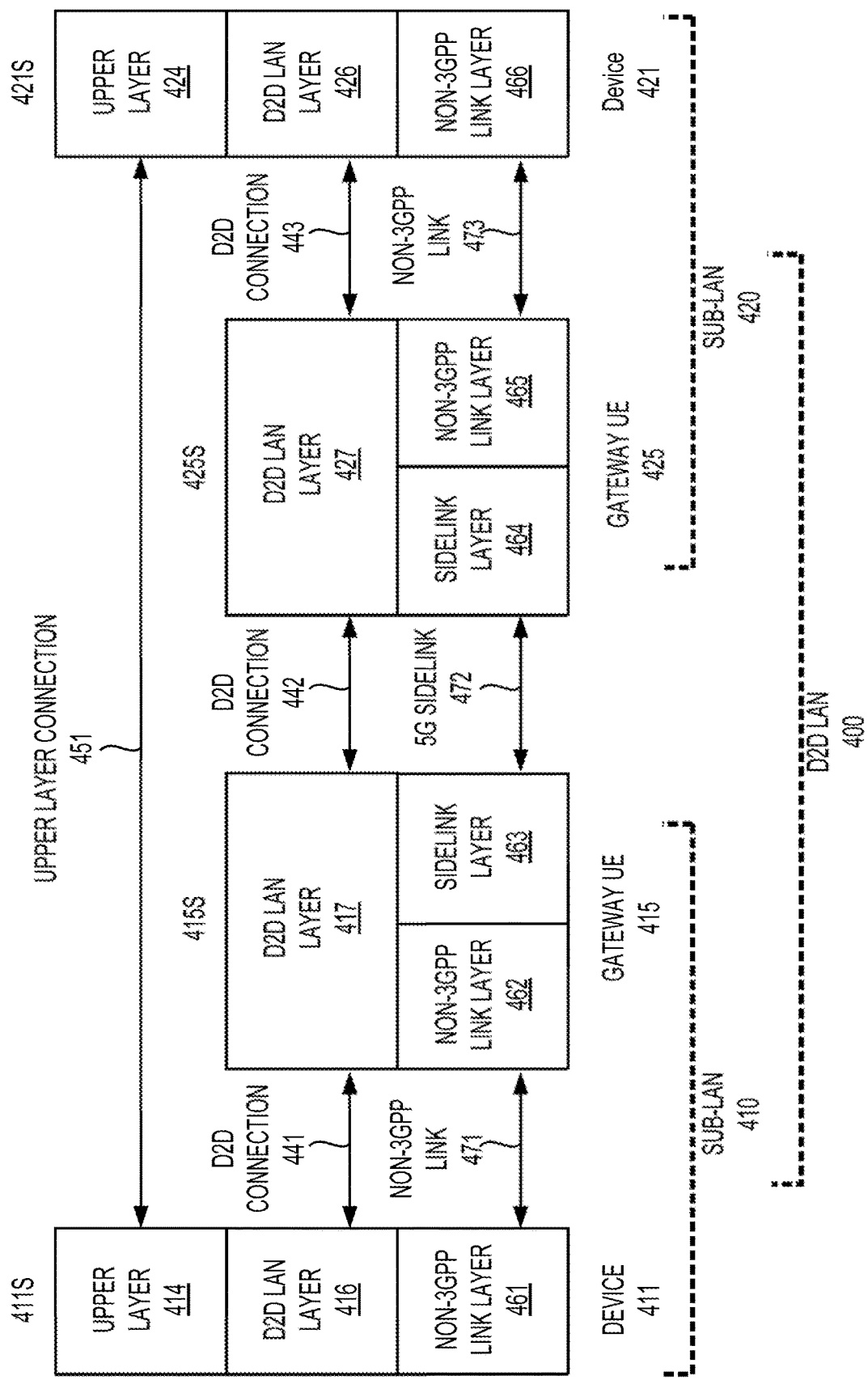
FIG. 4 shows another set of protocol stacks of a D2D LAN 400 according to an embodiment of the disclosure

FIG. 4 shows another set of protocol stacks of a D2D LAN 400 according to an embodiment of the disclosure. The D2D LAN 400 can include a first sub-LAN 410 and a second sub-LAN 420. The sub-LAN 410 can include a member device 411 coupled to a first gateway UE 415. while the sub-LAN 420 can include a member device 421 coupled to a second gateway UE 425. Four protocol stacks 411 S. 415S. 425S, and 421S corresponding to the elements 411, 415,425, and 421. respectively, are shown.

The protocol stack 41 IS of the device 411 includes a non-3GPP link layer 461, a D2D LAN layer 416, and an upper layer 414. The protocol stack 415S of the gateway UE 415 includes a D2D LAN layer 417, and, under the D2D LAN layer 417, a non-3GPP link layer 462 facing the device 411 and a sidelink layer 463 facing the gateway UK 425. The protocol stack 421S of the device 421 includes a non-3GPP link layer 466, a D2D LAN layer 426, and an upper layer 424. The protocol stack 425S of the gateway UE 425 includes a D2D LAN layer 427, and, below the D2D LAN layer 427, a sidelink layer 464 facing the gateway UE 415 and a non-3GPP link layer 465 facing the device 421.

Between the device 411 and the gateway UE 415, non-3GPP link layers 461 and 462 can cooperate with each other to establish a non-3GPP link 471. Between the device 421 and the gateway UE 425, non-3GPP link layers 466 and 465 can cooperate with each other to establish a non-3GPP link 473. For example, the non-3GPP link layer can be implemented by employing various non-3GPP LAN connection technologies (e.g., typically Ethernet, or Wi-Fi specified by IEEE standards). Between the gateway UEs 415 and 425, the sidelink layers 463 and 464 can cooperate with each other to establish a sidelink connection 472. The connections 471,472, and 473 can serve as a transport connection for delivering D2D packets between the D2D LAN layers 416/417/427/426.

Each of the D2D LAN layers 416 417/427/426 can be configured to perform functions similar to the D2D LAN layers 316/317/327/326, respectively, in the FIG. 3 example. The upper layers 414 and 424 can operate in a similar way as the upper layers 314 and 324 in the FIG. 3 example.

Figure 5:
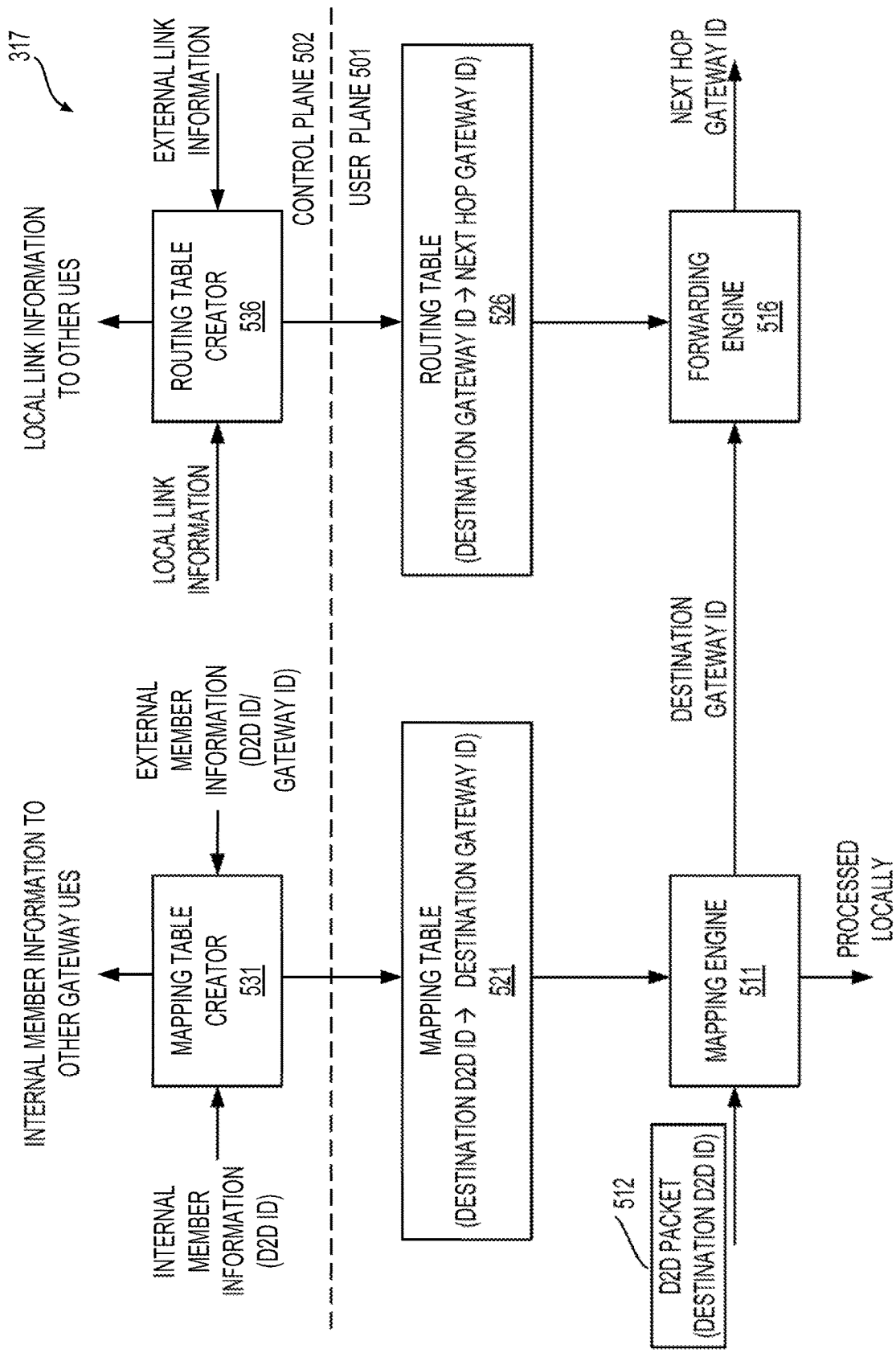
FIG. 5 shows functional modules of the D2D LAN layer 317 according to an embodiment of the disclosure.

FIG. 5 shows functional modules of the D2D LAN layer 317 according to an embodiment of the disclosure. The functional modules of the D2D LAN layer 317 can include a mapping table creator 531, and a routing table creator 536 at a control plane 502 of the D2D LAN layer 317, and a mapping table 521, a routing table 526, a mapping engine 511, and a forwarding engine 516 at a user plane 501 of the D2D LAN layer 317.

The mapping table creator 531 can be configured to create the mapping table 521 based on member information of the devices belonging to the sub-LANs of the D2D LAN 300 (e.g., the sub-LAN 310 and the sub-LAN 320) in the FIG. 3 example. For example, during the first discovery process, the member devices of the sub-LAN 310 can provide respective member information (e.g., DEVICE IDs) to the gateway UE 315, for example, in response to a request broadcast from the gateway UE 315. Member information of the member devices of the sub-LAN 320 as well as the gateway ID of the gateway UE 325 caw be forwarded to the gateway UE 315 from the gateway UE 325, for example, by broadcast communications Similarly, member information of the member devices of other sub-LANs (not shown in FIG. 3) as well as gateway IDs of the other sub-LANs can be forwarded to the gateway UE 315 from the other gateway UEs by broadcast communications among the gateway UEs belonging to the D2D LAN 300. The member information can be carried in D2D packets initiated from the respective member devices (including the gateway UEs).

Based on the received member information, the mapping table creator 531 can have knowledge of the gateway IDs of the gateway UEs in the D2D LAN 300, and DEVICE IDs of the member devices (including DEVICE IDs of each gateway UEs) associated with each gateway ID. Accordingly, the mapping table creator 531 can create the mapping table 521. Each entry in the mapping table 521 can indicate a mapping from one DEVICE ID to one gateway ID. This mapping relationship of each of the DEVICE IDs of the D2D LAN 300 can be listed in the mapping table 521. The member information can be periodically updated to the mapping table creator 531 by the respective member devices or gateway UEs. The mapping table creator 531 can also periodically update the gateway UEs (other than the gateway UE 315) with member information of internal member devices of the sub-LAN 310.

The mapping engine 511 can be configured to determine a destination gateway UE for a received D2D packet. For example, a D2D packet 512 is received at the mapping engine 511. The D2D packet 512 can carry a destination DEVICE ID and a source DEVICE ID in its header. The D2D packer 512 can be initiated from a device belonging to the sub-LAN 310 (e.g., the device 311), the gateway UE 315, or one of the other gateway UEs in the D2D LAN 300. Upon receiving the D2D packet 512, the mapping engine 511 can consult the mapping table 521, and accordingly determine a destination gateway ID corresponding to the destination DEVICE ID. The destination gateway ID can be a gateway ID of an menial gateway UE (e.g., the gateway UE 325). Accordingly, the D2D packet is forwarded to the forwarding engine 516.

Alternatively, the destination gateway ID can be the gateway ID of the gateway UE 315. which means the D2D packet is destined for the gateway UE 315. For example, the D2D packet 512 can be initiated from a member device of the sub-LAN 310. Or, the D2D packet 512 can be initiated or relayed from the gateway UE 325. Accordingly, the D2D packet 512 is processed locally.

The routing table creator 536 can be configured to create the routing table 526 based on link information received from the gateway UEs belonging to the D2D LAN 300. For example, the D2D LAN 300 can include dozens of gateway UEs each associated with a sub-LAN. The gateway UEs are connected via sidelinks to form the D2D LAN 300. Each gateway UE can monitor qualities of the respective sidelinks towards itself (initiated from a neighbor gateway UE and ended at the local gateway UE) based on reference signals received over the respective sidelinks. Link qualities obtained at each gateway UE can be provided to other gateway UEs in the D2D LAN 300. The link quality information can be carried in D2D packets initiated from the respective gateway UE.

During the second discovery process, the routing table creator 536 at the gateway UE 315 can receive link information (e.g., a link quality and a pair of DEVICE IDs for identifying an associated link) broadcast from other gateway UEs in the D2D LAN 300. The routing table creator 536 can also receive local link information including link qualities of local sidelinks that are ended at the gateway UE 315 and initiated from gateway UEs neighboring the gateway UE 315. Based on the received link information, the routing table creator 536 can have a global view of the topology of a network of the connected gateway UEs in the D2D LAN 300, and a link quality associated with each link connecting two neighboring gateway UEs. It is noted that the links connecting the gateway UEs are directional, and a pair of DEVICE IDs corresponding to a gateway UE starting the link and a gateway UE ending the link are used to identify the respective link.

Based on the knowledge of the topology and the link qualities, the routing table creator 536 can determine the routing table 526. The routing table 526 can include multiple entries. Each entry can be indexed using a destination gateway ID corresponding to a destination gateway UE in the D2D LAN 300, and indicate a next hop gateway UE (using a respective gateway ID) for forwarding a D2D packet to the destination gateway UE.

After the routing table 526 is established during the second discovery process, the routing table creator 536 can periodically update the routing table 526 based on updated link information periodically received from the local physical layer or from external gateway UEs. For example, each gateway UE in the D2D LAN 300 can periodically broadcast routing update messages carrying the latest local link information during each routing update period.

The forwarding engine 516 can be configured to determine a next hop gateway UE for forwarding the D2D packet 512. For example, the forwarding engine 516 can receive the destination gateway ID determined by the mapping engine 511 corresponding to the destination DEVICE ID carried in the D2D packet 512. By consulting the routing table 526, rite forwarding engine 516 can determine a next hop gateway ID corresponding to the received destination gateway ID, and accordingly forward to the D2D packet 512 to the next hop gateway UE identified by the next hop gateway ID.

Figure 6:
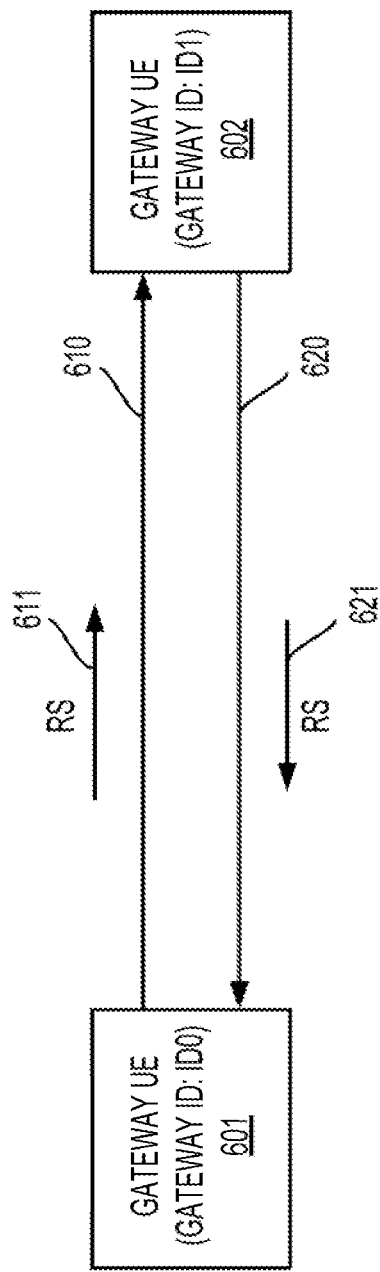
FIG. 6 shows directional sidelinks 610 and 620 between two gateway UEs 601 and 602 according to an embodiment of the disclosure.

FIG. 6 shows directional sidelinks 610 and 620 between two gateway UEs 601 and 602 according to an embodiment of the disclosure. For example, the gateway UEs 601 and 602 can each have a gateway ID: ID0 and ID1. The first directional sidelink 610 is initiated from the gateway UE 601 and ended at the gateway UE 602, and carries signals transmitted from the gateway UE 601 to the gateway UE 601. Accordingly, the first directional sidelink 610 can be identified by a pair of gateway IDs [ID0 ID1]. In contrast, the second directional sidelink 620 is initiated from the gateway UE 602 and ended at the gateway UE 601, and carries signals transmitted from the gateway UE 602 to the gateway UE 601. Accordingly, the second directional sidelink 610 can be identified by a pair of gateway IDs [ID1 ID0]. As shown, both the sidelinks 610-620 are connected between the gateway UE 601 and the gateway UE 602, but each have a different direction for transmissions from the gateway UE 601 to the gateway UE 602 or vice versa.

The gateway UE 602 can measure a reference signal (RS) 611 transmitted from the gateway 601, and use the measurement result to indicate a quality of the sidelink 610. In an example, a signal to interference and noise ratio (SINR) is measured and used as a metric for indicating a quality of the sidelink 610. For example, an orthogonal frequency division multiplex (OFDM) scheme is used for transmissions between the gateway UEs 601 and 602 The RS 611 can be periodically transmitted over a time-frequency resource grid including an array of resource elements (REs). Each RE corresponds to a symbol in time domain and a subcarrier in frequency domain. In time domain, the RS 611 can be transmitted over symbols that are periodically distributed over the resource grid. In frequency domain, the RS 611 can occupy a subset of subcarriers over a frequency range in which the gateway UEs 601 and 602 operates. A measure of SINR can be defined to be over a time window for the measurement, a ratio of received power of the RS 611 over all REs carrying the RS 611 to received power over all REs in the symbols carrying the RS 611.

The SINR measurement can be periodically performed at a physical layer of the gateway UE 602, and reported to a D2D LAN layer of the gateway UE 602. Over each routing update period, the D2D LAN layer can periodically receive multiple SINR measurements, and calculate an averaged SINR value of the received SINR measurements. The averaged SINR value can be provided to gateway UEs belonging to a D2D LAN including the gateway UEs 601 and 602. For example, the gateway UE 602 can periodically broadcast a routing update message to neighboring gateway UEs. The routing update message can carry a latest averaged SINR value for indicating a link quality of the sidelink 610. Such a link quality can be referred to as a SINR quality. At a gateway UE which receives the SINR quality associated with the sidelink 610 can perform routing table creation or updating based on the received SINR quality.

The RS 611 can be a sounding signal periodically transmitted from the gateway UE 601 according to a configuration. In an example, the gateway UE 601 periodically transmits a sidelink primary synchronization signal (PSS) and a sidelink secondary synchronization signal (SSS). Those synchronization signals can be used as the RS 611 for SINR measurement.

According to the disclosure, the measured interference and noise power in SINR can reflect an interference level caused by UEs surrounding the gateways UE 601 and 602. A high interference level (corresponding to a low SINR value) can indicate a high level transmission activities of those neighboring UEs. As the neighboring UEs and the gateway UEs 601-602 can share a same spectrum for the transmissions, the high level transmission activities would reduce radio resources in the resource grid available for transmissions over the sidelink 610, which limits transmission bandwidth of the sidelink 610. Accordingly, SINR can be an efficient metric for indicating a quality of a respective sidelink.

In an example, updating of the latest SINR quality can be performed based on a threshold. For example, a first link quality threshold can be defined, and only when a latest SINR quality of the sidelink 610 is above the first link quality threshold, the latest SINR quality is transmitted over a routing update message sent from the gateway UE 602. Accordingly, at a gateway UE performing routing table updating, the gateway UE can consider only sidelinks of which respective link quality measurements are available. Sidelinks of which respective latest link quality measurements are unavailable are excluded from the consideration when creating the routing table.

In another example, a second link quality threshold can be defined, and only when a latest SINR quality of the sidelink 610 is below the first link quality threshold, the latest SINR quality is transmitted over a routing update message sent from the gateway UE 602. Accordingly, at a gateway UE performing routing table updating, the gateway UE can consider sidelinks of which respective link quality measurements are not received (those sidelinks have better qualities). When sidelinks with better qualities (above the second link quality threshold) are not available, sidelinks of which respective link quality measurements are received will be considered for creating the routing table.

In some examples, the gateway UE 602 can have multiple associated sidelinks ended at the gateway UE 602. Accordingly, the gateway UE 602 can provide multiple link qualities corresponding to the multiple sidelinks when transmitting a routing update message during a touting update period.

Figure 7:
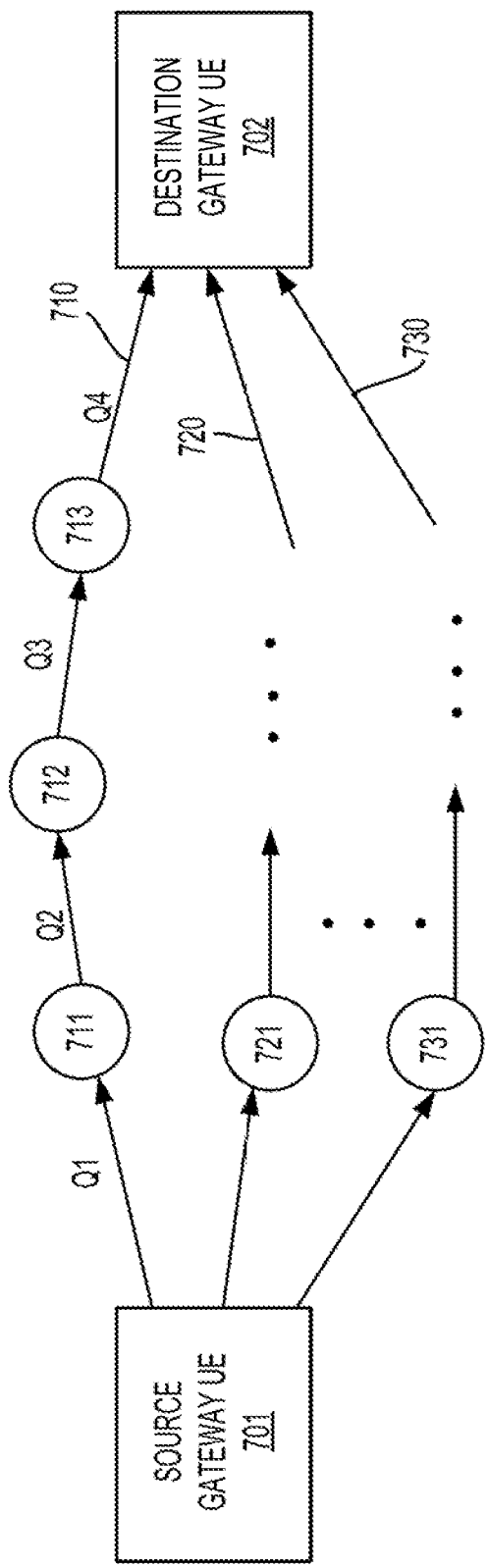
FIG. 7 shows a source gateway UE 701 and a destination gateway UE 702.

FIG. 7 shows a source gateway UE 701 and a destination gateway UE 702. The source gateway UE 701 and the destination gateway UE 70 can belong to a D2D LAN including a set of gateway UEs connected via sidelinks. The gateway UEs in the D2D LAN can each periodically transmit routing update messages carrying link information to other gateway UEs. The source gateway UE 701 (using a routing table creator function module) can determine (or update) a local routing table based on the link information received from the other gateway UEs.

For example, based on received SINR qualities and pairs of DEVICE IDs for identifying respective sidelinks, the source gateway UE 701 can determine a set of routes 710-730 existing between the source gateway UE 701 and the destination gateway UE 702. Each route 710-730 can include a sequence of intermediate nodes (gateway UEs). Sidelinks between the intermediate nodes in each route can be associated with a SINR quality. The source gateway UE 701 can select a best route from the routes 710-730, and accordingly determine a next hop gateway UE from neighboring nodes 711/721/731. Subsequently, an entry indicating the selected next hop gateway UE and indexed with the destination gateway UE 702 can be added into the routing table.

In an example, more than one best routes are selected from the candidate routes 710-730. Accordingly, multiple next hop gateway UEs are indicated in the routing table corresponding to the destination gateway UE 702. For a D2D packet to be forwarded to the destination gateway UE 702, the source gateway UE 701 (at a forwarding engine) can randomly select one next hop gateway UE from the multiple next hop gateway UE for the forwarding operation.

Various methods can be employed for determine one or more best routes from the candidate routes 710-730. In an example, the best route(s) is determined according to a route quality associated with each route 710-730. The route quality is defined to be the minimum SINR quality of the respective route. For example, the route 710 passes through intermediate nodes 711-713 over 4 sidelinks each having a SINR quality represented by Q1, Q2, Q3, and Q4. Assuming Q3 has a minimum value, the SINR quality Q3 is used as the route quality of the route 710. Accordingly, the routes with highest route qualities can be selected to be the best routes.

In an example, the first link quality threshold as described above is employed, and the gateway UEs update SINR qualities of respective sidelinks when the corresponding SINR quality is above the first link quality threshold. Under such a configuration, the source gateway UE 701 can ignore a route (among the candidate routes 710-730) including a sidelink for which no SINR quality is available. Using the route quality as a metric, a best route(s) can be selected from routes of which every sidelink has an available SINR quality updated recently.

In an example, the second link quality threshold as described above is employed, and the gateway UEs update SINR qualities of respective sidelinks when the corresponding SINR quality is below the second link quality threshold. Under such a configuration, the source gateway UE 701 can select a best route(s), for example, based on a metric of least number of bops, among the routes that each do not include a sidelink associated with a SINR quality updated recently (e.g., updated during a latest routing update period). When the routes that each do not include a sidelink associated with a SINR quality updated recently are not available, a best route(s) can be selected among the existing routes 710-730 based on the metric of route quality.

In an example, the source gateway UE 701 receives SINR qualities associated with the intermediate nodes on the route 710-730. For each intermediate node, a node quality can be determined. The node quality can be defined to be an average of SINR qualities of sidelinks ended at the respective node. If a node quality of an intermediate node is below a node quality threshold, the routes passing through this intermediate node are removed from the candidate routes 710-730 for determine best routes between the source gateway UE 701 and the destination gateway UE 702.

In some examples, when all candidate routes 710-730 each include at least one intermediate node having a node quality lower than a first node quality threshold, the source gateway UE 701 can determine to fallback to a path passing a 5GS. In a first example, the source gateway UE 701 can use 5G LAN-type service provided be the 5GS to establish a route between the source gateway UE 701 and the destination gateway UE 702 for forwarding D2D packets to the destination gateway UE 720. Alternatively, the source gateway UE 701 can simultaneously employ one or more candidate routes 710-720 and the route traversing the 5GS for forwarding D2D packets In a second example, along the route 710, the intermediate node 711 has a node quality below the first node quality threshold, and all the intermediate nodes (e.g., the nodes 712 and 713) between the intermediate node 711 and the destination gateway UE 702 have node qualities above a second node quality threshold (higher than the first node quality threshold), the source gateway UE 701 can determine to establish a route passing the 5GS and destined at one of the intermediate nodes 712-713 between the intermediate node 711 and the destination gateway UE 702. For example, the intermediate node 712 is within coverage of the 5GS, while the intermediate node 713 is out of the coverage of the 5GS. The intermediate node 712 is selected to end the connection passing the 5GS, and passing packets from the source gateway UE 701 to the intermediate node 713. In this way, the intermediate node 711 with the low node quality is bypassed.

Figure 8:
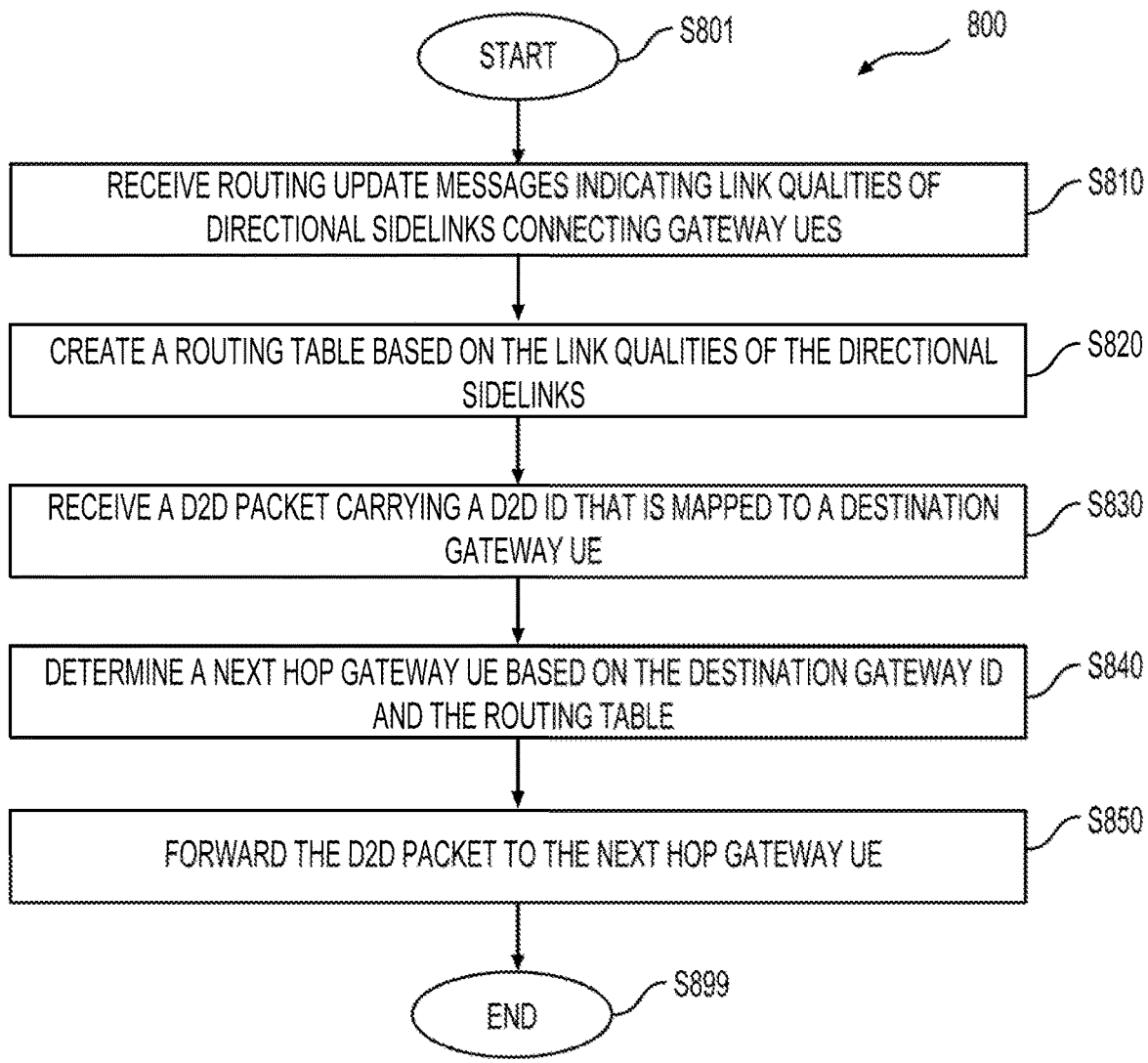
FIG. 8 show s a D2D packet forwarding process 800 according to some embodiments of the disclosure.

FIG. 8 shows a D2D packet forwarding process 800 according to some embodiments of the disclosure. The process 800 can be performed at the D2D LAN layer 317 in the FIG. 3 example, or the D2D LAN layer 417 in the FIG. 4 example. The process 800 can start from S801, and proceed to S810.

At S810, routing messages can be received during a routing update period at a first gateway UE of a first sub-LAN in a D2D LAN. For example, the D2D LAN can include the first sub-LAN and multiple second sub-LANs, Each of the second sub-LANs can include a second gateway UE. Each of the first and second sub-LANs can include a set of member devices exchanging D2D packets with the respective gateway UE. The first and second gateway UEs can be connected with directional side links (e.g., 5G sidelinks). The routing update messages can each be received from one of the second gateway UEs. Each of the routing update messages can indicate one or more link qualities of the directional sidelinks ended at the respective gateway UE corresponding to the respective routing update message.

For example, the first and second gateway UEs can periodically transmit routing update messages that are broadcast in the D2D LAN. In this way, based on the routing updates, each of the first and second gateway UEs can have a global view of the D2D LAN regarding, for example, the topology of a network of the first and second gateway UEs and link qualities of the sidelinks connecting the first and second gateway UEs.

At S820, a routing table can be created based on the link qualities of the directional sidelinks indicated by the routing update messages. Each entry in the routing table can be indexed by one of the second gateway UEs as a destination gateway UE. Each entry can indicate a next hop gateway UE. For example, one or more best routes can be selected among candidate routes between the first gateway UE and a destination gateway UE. A gateway UE along the selected routes neighboring the first gateway UE can be determined to be a next hop gateway UE.

At S830, a D2D packet to be transmitted to one of the second gateway UEs as a destination gateway UE can be received from one of the member devices of the first sub-LAN. For example, the D2D packet can carry a DEVICE ID in a header of the D2D packet. The DEVICE ID can correspond to a member device belonging to one of the second sub-LANs including the destination gateway UE. Based on the DEVICE ID, the destination gateway UE can be determined by looking up a mapping table that maps each DEVICE ID to a corresponding gateway ID.

At S840, a next hop gateway UE can be determined according to the destination gateway UE and the routing table.

At S850, the D2D packet is forwarded to the determined next hop gateway UE. The forwarded D2D packet does not carry the corresponding gateway ID of the destination gateway UE in an example. The process 800 can proceed to S899, and terminate at S899.

Figure 9:
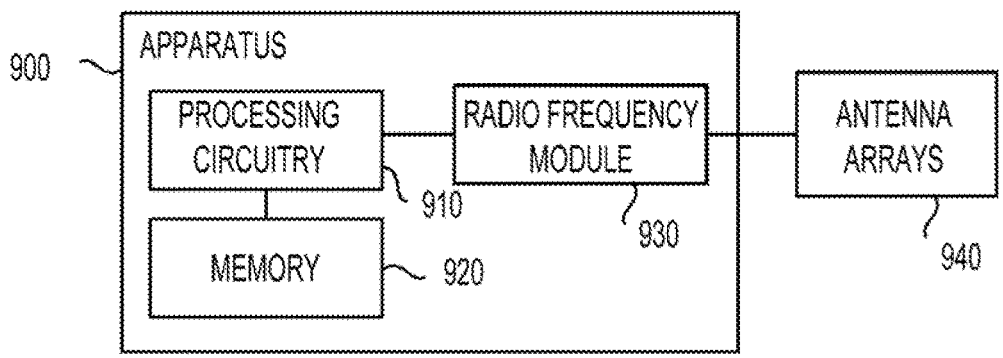
FIG. 9 shows an exemplary apparatus 900 according to embodiments of the disclosure.

FIG. 9 shows an exemplary apparatus 900 according to embodiments of the disclosure. The apparatus 900 can be configured to perform various functions in accordance with one or more embodiments or examples described herein. Thus, the apparatus 900 can provide means for implementation of mechanisms, techniques, processes, functions, components, systems described herein For example, the apparatus 900 can be used to implement functions of UEs, member devices, base stations, and elements of core networks in various embodiments and examples described herein. The apparatus 900 can include a general purpose processor or specially designed circuits to implement various functions, components, or processes described herein in various embodiments. The apparatus 900 can include processing circuitry 910, a memory 920, and optionally a radio frequency (RF) module 930.

In various examples, the processing circuitry 910 can include circuitry configured to perform the functions and processes described herein in combination with software or without software. In various examples, the processing circuitry 910 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 910 can be a central processing unit (CPU) configured to execute program instructions to perform various functions and processes described herein. Accordingly, the memory 920 can be configured to store program instructions. The processing circuitry 910. when executing the program instructions, can perform the functions and processes. The memory 920 can further store other programs or data, such as operating systems, application programs, and the like. The memory 920 can include non-transitory storage media, such as a read only memory (ROM), a random access memory (RAM), a flash memory, a solid state memory, a hard disk drive, an optical disk drive, and the like.

In an embodiment, the RF module 930 receives a processed data signal from the processing circuitry 910 and converts the data signal to beamforming wireless signals that are then transmitted via antenna arrays 940, or vice versa. The RF module 930 can include a digital to analog convener (DAC), an analog to digital convener (ADC), a frequency up convener, a frequency down convener, filters and amplifiers for reception and transmission operations. The RF module 930 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 940 can include one or more antenna arrays.

The apparatus 900 can optionally include other components, such as input and output devices, additional or signal processing circuitry, and the like. Accordingly, the apparatus 900 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
    receiving member information from first member devices at a first gateway user equipment (UE) in a device-to-device (D2D) local area network (LAN), the D2D LAN including a first sub-LAN and at least one second sub-LAN, the first sub-LAN including the first gateway UE and the first member devices exchanging D2D packets with the first gateway UE, each of the second sub-LANs including a second gateway UE and a set of second member devices exchanging D2D packets with the respective second gateway UE, the first and second gateway UEs being connected with sidelinks, the member information indicating a first Device IDentifier (ID) associated with the respective first member device;
    updating a first member device list including the first DEVICE IDs of the first member devices of the first sub-LAN based on the received member information; and
    broadcasting a first mapping update message including the updated first member device list and a first gateway ID of the first gateway UE to the second gateway UEs of the second-sub-LANs.

2. The method of claim 1, further comprising:
    receiving a second mapping update message from one of the second gateway UEs, the second mapping update message including a second member device list that includes second DEVICE IDs of the second member devices of the one of the second sub-LANs and a second gateway ID of the one of the second gateway UEs; and
    updating a mapping table based on the received second member device list, each entry in the mapping table being indexed by one of second DEVICE IDs of the second member devices of the second sub-LANs as a destination DEVICE ID and indicating a second gateway ID of one of the second gateway UEs that corresponds to the second sub-LAN including the second member device having the destination DEVICE ID.

3. The method of claim 2, further comprising:
    adjusting a configuration of radio resources over the sidelink connecting the first gateway UE and the second gateway UE from which the second mapping update message is received in response to an increase or decrease of one or more of the second member devices of the second gateway UE from which the second mapping update message is received.

4. The method of claim 1, further comprising:
    receiving a routing update message during a routing update period at the first gateway UE from one of the second gateway UEs, the routing update message indicating one or more link qualities of the sidelinks ended at the second gateway UEs from which the routing update message is received;
    updating a routing table based on the link qualities of the sidelinks indicated by the routing update message, each entry in the routing table being indexed by the second gateway ID of one of the second gateway UEs in the D2D LAN as a destination gateway UE and indicating the second gateway ID of one of the second gateway UE as a next hop gateway UE;
    receiving a D2D packet from one of the first member devices of the first sub-LAN, the D2D packet including a destination DEVICE ID;
    determining the second gateway ID of the one of the second gateway UEs corresponding to the destination DEVICE ID in the mapping table based on the destination DEVICE ID in the D2D packet:
    determining one of the next hop gateway UEs according to the second gateway ID of the one of the second gateway UEs corresponding to the destination DEVICE ID and the routing table; and
    forwarding the D2D packet to the determined next hop gateway UE.

5. The method of claim 4, wherein each of the link qualities of the sidelinks indicated by the routing update messages is indicated by a signal to interference and noise ratio (SINR) quality defined to be an averaged SINR value of a sequence of SINR values measured using reference signals transmitted over the respective sidelink during the routing update period.

6. The method of claim 5, wherein the updating the routing table based on the link qualities of the sidelinks indicated by the routing update messages includes:
    selecting a route from multiple candidate routes between the first gateway UE and the destination gateway UE with a highest route quality, each of the multiple candidate routes having a route quality defined to be a minimum SINR quality among the SINR qualifies of the sidelinks along the respective candidate route.

7. The method of claim 6, wherein the SINR qualities of the sidelinks indicated by the routing update messages are above a first link quality threshold, and SINR qualities of the sidelinks connecting the second gateway UEs that are below the first link quality threshold are not provided by the routing messages.

8. The method of claim 5, wherein the SINR qualities of the sidelinks indicated by the routing update messages are below a second link quality threshold, SINR qualities of the sidelinks connecting the second gateway UEs that are above the second link quality threshold are not provided by the routing messages, and
    the updating the routing table based on the link qualities of the sidelinks indicated by the routing update messages includes:
        selecting a route from multiple candidate routes between the first gateway UE and the destination gateway UE based on a metric of a least number of hops, routes between the first gateway UE and the destination gateway UE that each include a sidelink associated with one of the SINR qualities indicated in the routing update messages received during the routing update period being excluded from the multiple candidate routes.

9. The method of claim 5, wherein the updating the routing table based on the link qualities of the sidelinks indicated by the routing update messages includes:
    selecting a route from multiple candidate routes between the first gateway UE and the destination gateway UE, routes between the first gateway UE and the destination gateway UE that each pass at least one intermediate node with a node quality lower than a node quality threshold being excluded from the multiple candidate routes, the node quality defined to be an average of SINR qualities of sidelinks ended at the respective node.

10. The method of claim 5, further comprising:
in response to candidate routes between the first gateway UE and the destination gateway UE each including a first intermediate node with a node quality lower than a first node quality threshold, the node quality defined to be an average of SINR qualities of sidelinks ended at the respective node, determining to fall back to a path passing a fifth generation system (5GS) for forwarding a D2D packet from the first gateway UE and the destination gateway UE.

11. The method of claim 10, wherein the path is established between the first gateway UE and the destination gateway UE.

12. The method of claim 10, wherein the path is established between the first gateway UE and a second intermediate node in a first candidate route of the candidate routes between the first gateway UE and the destination gateway UE, the second intermediate node and any other intermediate node(s) between the second intermediate node and the destination gateway UE each having a node quality above a second node quality threshold higher than the first node quality threshold.

13. An apparatus in a first gateway user equipment (UE), comprising circuitry configured to:
receive member information from first member devices at the first gateway UE in a device-to-device (D2D) local area network (LAN), the D2D LAN including a first sub-LAN and at least one second sub-LAN, the first sub-LAN including the first gateway UE and the first member devices exchanging D2D packets with the first gateway UE, each of the second sub-LANs including a second gateway UE and a set of second member devices exchanging D2D packets with the respective second gateway UE, the first and second gateway UEs being connected with sidelinks, the member information indicating a first Device IDentifier (ID) associated with the respective first member device;
update a first member device list including the first DEVICE IDs of the first member devices of the first sub-LAN based on the received member information; and
broadcast a first mapping update message including the updated first member device list and a first gateway ID of the first gateway UE to the second gateway UEs of the second-sub-LANs.

14. The apparatus of claim 13, wherein the circuitry is further configured to:
receive a second mapping update message from one of the second gateway UEs, the second mapping update message including a second member device list that includes second DEVICE IDs of the second member devices of the one of the second sub-LANs and a second gateway ID of the one of the second gateway UEs; and
update a mapping table based on the received second member device list, each entry in the mapping table being indexed by one of second DEVICE IDs of the second member devices of the second sub-LANs as a destination DEVICE ID and indicating a second gateway ID of one of the second gateway UEs that corresponds to the second sub-LAN including the second member device having the destination DEVICE ID.

15. The apparatus of claim 14, wherein the circuitry is further configured to:
adjust a configuration of radio resources over the sidelink connecting the first gateway UE and the second gateway UE from which the second mapping update message is received in response to an increase or decrease of one or more of the second member devices of the second gateway UE from which the second mapping update message is received.

16. The apparatus of claim 13, wherein the circuitry is further configured to:
receive a routing update message during a routing update period at the first gateway UE from one of the second gateway UEs, the routing update message indicating one or more link qualities of the sidelinks ended at the second gateway UEs from which the routing update message is received;
update a routing table based on the link qualities of the sidelinks indicated by the routing update message, each entry in the routing table being indexed by the second gateway ID of one of the second gateway UEs in the D2D LAN as a destination gateway UE and indicating the second gateway ID of one of the second gateway UE as a next hop gateway UE;
receive a D2D packet from one of the first member devices of the first sub-LAN, the D2D packet including a destination DEVICE ID;
determine the second gateway ID of the one of the second gateway UEs corresponding to the destination DEVICE ID in the mapping table based on the destination DEVICE ID in the D2D packet;
determine one of the next hop gateway UEs according to the second gateway ID of the one of the second gateway UEs corresponding to the destination DEVICE ID and the routing table; and
forward the D2D packet to the determined next hop gateway UE.

17. The apparatus of claim 16, wherein each of the link qualities of the sidelinks indicated by the routing update messages is indicated by a signal to interference and noise ratio (SINR) quality defined to be an averaged SINR value of a sequence of SINR values measured using reference signals transmitted over the respective sidelink during the routing update period.

18. The apparatus of claim 17, wherein the circuitry is further configured to:
select a route from multiple candidate routes between the first gateway UE and the destination gateway UE with a highest route quality, each of the multiple candidate routes having a route quality defined to be a minimum SINR quality among the SINR qualities of the sidelinks along the respective candidate route.

19. The apparatus of claim 18, wherein the SINR qualities of the sidelinks indicated by the routing update messages are above a first link quality threshold, and SINR qualities of the sidelinks connecting the second gateway UEs that are below the first link quality threshold are not provided by the routing messages.

20. A non-transitory computer-readable medium storing instructions that, when performed by a processor, cause the processor to perform a method, the method comprising:
receive member information from first member devices at a first gateway user equipment (UE) in a device-to-device (D2D) local area network (LAN), the D2D LAN including a first sub-LAN and at least one second sub-LAN, the first sub-LAN including the first gateway UE and the first member devices exchanging D2D packets with the first gateway UE, each of the second sub-LANs including a second gateway UE and a set of second member devices exchanging D2D packets with the respective second gateway UE, the first and second gateway UEs being connected with sidelinks, the member information indicating a first Device IDentifier (ID) associated with the respective first member device;

update a first member device list including the first DEVICE IDs of the first member devices of the first sub-LAN based on the received member information; and broadcast a first mapping update message including the updated first member device list and a first gateway ID of the first gateway UE to the second gateway UEs of the second-sub-LANs.

\* \* \* \* \*